United States Patent
Romme et al.

(10) Patent No.: US 10,090,946 B2
(45) Date of Patent: Oct. 2, 2018

(54) METHOD AND DEVICE FOR CALCULATING AVERAGE RECEIVED POWER

(71) Applicant: Stichting IMEC Nederland, Eindhoven (NL)

(72) Inventors: Jacobus Petrus Adrianus Romme, Schiedam (NL); Keishi Kajiwara, Eindhoven (NL)

(73) Assignees: Stichting IMEC Nederland, Eindhoven (NL); MegaChips Corporation, Osaka (JP)

(*) Notice: Subject to any disclaimer, the term of this patent is extended or adjusted under 35 U.S.C. 154(b) by 29 days.

(21) Appl. No.: 15/334,055

(22) Filed: Oct. 25, 2016

(65) Prior Publication Data

US 2017/0117976 A1   Apr. 27, 2017

(30) Foreign Application Priority Data

Oct. 27, 2015  (EP) .................................. 15191741

(51) Int. Cl.
*H04W 64/00* (2009.01)
*H04B 17/318* (2015.01)
(Continued)

(52) U.S. Cl.
CPC .......... *H04B 17/318* (2015.01); *H04L 1/004* (2013.01); *H04W 64/00* (2013.01); *G06F 1/03* (2013.01)

(58) Field of Classification Search
USPC ....................................... 455/404.2; 370/252
See application file for complete search history.

(56) References Cited

U.S. PATENT DOCUMENTS 4,315,746 A * 2/1982 Heidrich ............... G01S 7/4052
                                                                342/169
5,944,774 A * 8/1999 Dent ....................... G06F 7/556
                                                                708/517

(Continued)

FOREIGN PATENT DOCUMENTS

GB         2401444 A       11/2004

OTHER PUBLICATIONS

European Search Report dated May 10, 2016 in European Application No. EP 15191741.6.

(Continued)

*Primary Examiner* — Ganiyu A Hanidu
(74) *Attorney, Agent, or Firm* — Knobbe Martens Olson & Bear LLP (57) ABSTRACT

A device for calculating an indication of power of a received radio signal is disclosed. In one aspect, the device includes a receiver for receiving a plurality of logarithmic values representing a sequence of measurements of power of the received radio signal, and circuitry for determining a sum of the plurality of logarithmic values. The circuitry includes an adder for pairwise summing of two logarithmic values and a plurality of memory registers. The plurality of memory registers are arranged to store intermediate sums of logarithmic values. The circuitry is arranged to control the adder to sum the plurality of logarithmic values by a recursive procedure such that the first and the second logarithmic value in individual summations of the recursive procedure represent substantially same number of power measurements.

13 Claims, 3 Drawing Sheets

(51) Int. Cl.
    *H04L 1/00* (2006.01)
    *G06F 1/03* (2006.01)

(56) References Cited

U.S. PATENT DOCUMENTS

| | | | |
|---|---|---|---|
| 6,226,271 B1* | 5/2001 | Dent | H04B 17/318 370/252 |
| 7,787,891 B2* | 8/2010 | Taaghol | H04W 64/00 455/404.2 |
| 9,001,941 B2 | 4/2015 | Manglani et al. | |
| 2004/0093545 A1* | 5/2004 | Khandani | H04L 1/004 714/746 |
| 2006/0010296 A1* | 1/2006 | Dent | A63F 13/08 711/147 |
| 2006/0206550 A1* | 9/2006 | Uchino | G06F 1/0307 708/204 |

OTHER PUBLICATIONS

Benmahmoud, et al., A New Approximation to the Jacobian Logarithm Suitable for MAP Decoding in BICM-ID, Computer Technology and Application 4 (2013) 241-244.
Ruhm, Rekursive Mittelung—Arithmetischer Mittelungswert, Metgrologie Wissenschaft und Technik des Messensk, http://www.mmm.ethz.ch/dok01/d0000142, Feb. 20, 2010.
Thornwood, Method to Approximate the Logarithm of a Sum; IBM Technical Disclosure Bulletin, vol. 32, No. 5A, Oct. 1989, pp. 398-399.
Ikramov, Accumulation of Errors, Encyclopedia of Mathematics, http://www.encyclopediaofmath.org/index.php?title=Accumulation_of_errors&oldid=18250, page last modified on Feb. 7, 2011, 6 pages.

* cited by examiner

METHOD AND DEVICE FOR CALCULATING AVERAGE RECEIVED POWER

CROSS REFERENCE TO RELATED APPLICATIONS

This application claims foreign priority to European Patent Application No. 15191741.6, filed Oct. 27, 2015, the contents of which are incorporated by reference herein in its entirety.

BACKGROUND

Technological Field

The present disclosure relates to a method and a device for calculating an indication of power of a received radio signal.

Description of the Related Technology

In communication using radio technology, there is often a need or desire to determine the signal strength. For instance, in many communication standards, such as ZigBee®, Wi-SUN®, and Bluetooth® Low Energy (BTLE), Received Signal Strength Indicator (RSSI) and Clear Channel Assessment (CCA) are mandatory functionalities at physical layer level for supporting Logical Link Control (LLC) and Media Access Control (MAC). The functionalities may require that an average power for a given time interval is determined. Thus, the power of the radio signal in a specific frequency channel for a specific amount of time may need to be measured, so that the average power may be calculated.

Selecting a specific frequency channel may be realized in digital baseband, which implies that the average power or a related value or measure needs to be determined in digital domain. Further, the average power may be determined based on a sum of squares of the measured powers.

However, a digital average power detector may set extensive requirements, in terms of area and power demands, when a large number of digital values are to be summed, in particular if the numbers are to be squared before summing.

In U.S. Pat. No. 5,944,774, a method is disclosed for performing calculations on numbers expressed as logarithmic values. The method seeks to reduce the effort involved in adding or accumulating a large number of digital logarithmic values. The method is based on realization that logarithmic quantities are preferably not combined in order "smallest plus largest," since the contribution of the smallest number will disappear in the logarithmic representation of the sum. Instead, the two smallest quantities are preferably combined together first to produce a sum which is larger than each of the two quantities. The sum is preferably re-sorted in descending order of value with the remaining quantities to be summed and the two smallest quantities again combined and so forth until there are only two quantities left to combine, for example, the largest quantity and the sum of all the others.

However, the method of U.S. Pat. No. 5,944,774 requires that the logarithmic values are sorted before summation may be started and the partial sums re-sorted during summation. Hence, the sorting consumes time, power, memory and/or area.

SUMMARY OF CERTAIN INVENTIVE ASPECTS

It is an object of the disclosure to provide an improved method for calculating an indication of power of a received radio signal. It is a particular object of the disclosure to provide a method which has low demands on area of a circuitry implementing the method and power consumption of the circuitry.

These and other objects are at least partly met by the disclosure as defined in the independent claims. Additional embodiments are set out in the dependent claims.

According to a first aspect of the disclosure, there is provided a method for calculating an indication of power of a received radio signal, the method comprising: receiving a plurality of logarithmic values, wherein the logarithmic values represent in logarithmic domain a sequence of measurements of power of the received radio signal; determining an average received power based on the plurality of logarithmic values; wherein the determining includes: summing the plurality of logarithmic values, wherein a sum of a first and a second logarithmic value is calculated by determining the largest value of the first and the second logarithmic values and adding a rest value to the determined largest value, wherein the rest value is based on a difference between the first and the second logarithmic values and is determined by a look-up in a table and is approximated to zero if the difference between the first and the second logarithmic values is larger than a set threshold; wherein summing of the plurality of logarithmic values is performed by a recursive procedure including a plurality of summations of first and second logarithmic values such that the first and the second logarithmic value in individual summations of the recursive procedure represent substantially same number of power measurements.

According to a second aspect of the disclosure, there is provided a device for calculating an indication of power of a received radio signal, the device including: a receiver for receiving a plurality of logarithmic values, wherein the logarithmic values represent in logarithmic domain a sequence of measurements of power of the received radio signal; circuitry for determining a sum of the plurality of logarithmic values as basis for determination of an average received power; wherein the circuitry comprises: an adder for pairwise summing of two logarithmic values, wherein a sum of a first and a second logarithmic value is calculated by determining the largest value of the first and the second logarithmic values and adding a rest value to the determined largest value, wherein the rest value is based on a difference between the first and the second logarithmic values and is determined by a look-up in a table and is approximated to zero if the difference between the first and the second logarithmic values is larger than a set threshold; and a plurality of memory registers, which are arranged to store intermediate sums of logarithmic values, wherein the circuitry is arranged to control the logarithmic values being provided to the adder to sum the plurality of logarithmic values by a recursive procedure such that the first and the second logarithmic value in individual summations of the recursive procedure represent substantially same number of power measurements.

According to the disclosure, logarithmic values are used for representing a sequence of measurements of power of a received radio signal. The logarithmic values allow calculations to be performed in logarithmic domain. This implies that the number of bits required for representing the measurements of power is limited. Also, the summation of two logarithmic values may be very quickly performed as a determination of the largest value of the terms to be summed and addition of a rest value that depends only on the difference of both values and may be determined by table look-up.

Further, the plurality of logarithmic values is summed using a recursive procedure. The recursive procedure functions in a way to perform a plurality of individual summations of two logarithmic values. The two logarithmic values in each individual summation represent substantially same number of power measurements. Hence, if a large logarithmic value is present in the sequence, the large value cannot be individually summed numerous times to different smaller logarithmic values, since the resulting sum will eventually represent several power measurements and may thereafter not be summed with a single power measurement as the two values to be summed will not represent substantially same number of power measurements. This implies that, when a sum of two logarithmic values that are very different in magnitude is to be calculated in the recursive procedure, it is because the power measurements represented by the two values actually differ substantially in magnitude.

A small and biased error is introduced when a sum of a large value and a small value is approximated by the largest value. This error is introduced due to the approximation causing the smallest value not to contribute at all in the sum. However, thanks to the two values in individual summations representing substantially same number of power measurements, a plurality of such small errors are not allowed to accumulate to a large error in the total sum of the plurality of logarithmic values.

In the context of this application, the term "substantially same number of power measurements" should be construed as the difference in number of individual power measurements represented by the first and second logarithmic values being very small.

For instance, according to one embodiment, the number of power measurements represented by the first and the second logarithmic value in individual summations of the recursive procedure is equal or differs by no more than 1.

However, in other embodiments, the difference in number of power measurements may differ by more than one, such as two or three or even higher, especially when the number of power measurements represented by the first and second logarithmic values is quite high. In one embodiment, the difference in number of power measurements is no more than five.

According to an embodiment, the receiving of a plurality of logarithmic values comprises receiving a plurality of digital values representing a sequence of measurements of power of the received radio signal; and converting the plurality of digital values to a representation in logarithmic domain forming the plurality of logarithmic values.

Thus, the method for calculating an indication of power of a received radio signal may receive a plurality of digital values as input and may first convert these digital values to a representation in logarithmic domain before determining the average received power. The plurality of logarithmic values may then be further transferred to a process for determining an average received power based on the plurality of logarithmic values, the process thus receiving the logarithmic values.

According to an embodiment, each of the plurality of digital values is represented by a bit vector and conversion of the digital value comprises determining a largest index in the bit vector having a bit value of 1, and calculating a binary logarithm of the digital values based on a sum of the largest index and a mantissa value determined by table look-up, wherein a pre-determined number of bit values below the largest index are used as input to the table look-up.

The determination of the largest index in the bit vector having a bit value of 1 ensures that only the bits that provide actual information of the value in the bit vector are considered. Further, by making a table look-up, the conversion may be quickly performed. Also, the pre-determined number of bit values set a maximum number of bits that will be used as input to the table look-up. This implies that the size of the table to be used in the table look-up is dependent on the pre-determined number and by choosing the pre-determined number the size of the table may be adjusted. However, setting the pre-determined number of bit values to a low value implies that the accuracy of the conversion is low.

According to an embodiment, the pre-determined number of bit values is in a range of 3-6. Using a pre-determined number of bit values in this range implies that the table to be used in the table look-up is small, while the accuracy of the conversion is still acceptable.

According to an embodiment, calculating the binary logarithm includes adding a small constant to the mantissa value. Since the bit vector of the digital value is truncated such that only a pre-determined number of bit values are used in the conversion, the conversion will consistently provide an underestimation of the logarithmic value. This underestimation may be reduced by adding a small constant to the mantissa value.

According to an embodiment, the table look-up of the mantissa value returns a fractional number represented by a pre-determined number of bits. The logarithmic value will be a fractional number that may not be exactly represented. Rather, the accuracy of the fractional number returned from the table look-up may be controlled by choice of the pre-determined number of bits used for representing the fractional number. The number of bits used will also affect the size of the look-up table. Hence, if the pre-determined number of bits is low, a small size table will be provided returning fractional numbers with low accuracy, whereas if the pre-determined number of bits is high, a big size table will be provided returning fractional numbers with high accuracy.

According to an embodiment, the pre-determined number of bits is in a range of 5-7. Using a pre-determined number of bits in this range implies that the table to be used in the table look-up is small, while the accuracy of the conversion is still acceptable.

According to an embodiment, the recursive procedure comprises pairwise summations of logarithmic values to replace two logarithmic values by one summed logarithmic value such that the resulting number of logarithmic values is a power of 2. When the number of logarithmic values L is a power of 2, the summing of the plurality of remaining logarithmic values may be solved in a recursive manner. A total operation conducted by the recursive procedure can be described by a full and complete binary tree of height $\log_2(L)+1$ containing L leaves at its highest level. Each branch in the binary tree represents an input logarithmic value to a sum, and each node in the binary tree represents a sum of two logarithmic values. The two inputs to each node are given by the two children of the node.

According to an embodiment, the plurality of logarithmic values represents binary logarithms of squared digital values. A squaring of digital values ensures that the sign of the digital value is always positive. However, the number of bits required to represent the digital value is approximately doubled. Additionally, a multiplier or squaring block is area and power intensive. Thus, a representation in logarithmic values is especially advantageous compared to using squared digital values.

According to an embodiment, the set threshold controlling that the rest value is approximated to zero is in a range of 4-16. Since the rest value is approximated to zero, accuracy of the sum is impaired. However, the rest value for values above the set threshold may be very close to zero, so the approximation affects accuracy to a very small degree. Further, the number of entries in the look-up table for determining the rest value is dependent on the set threshold, which implies that using a low number for the set threshold will limit the size of the look-up table.

BRIEF DESCRIPTION OF THE DRAWINGS

These and other aspects of the present disclosure will now be described in further detail, with reference to the appended drawings showing embodiment(s) of the disclosure.

DETAILED DESCRIPTION OF CERTAIN ILLUSTRATIVE EMBODIMENTS

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
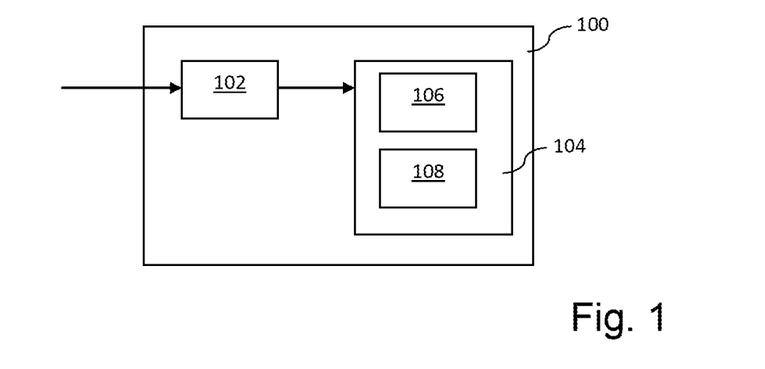
FIG. 1 is a schematic drawing of a device for calculating an indication of power of a received radio signal according to an embodiment of the disclosure.

Referring now to FIG. 1, a device 100 for calculating an indication of power of a received radio signal will first be generally described. The radio signal may be received by any unit that makes use of radio communication, such as a mobile phone or a device utilizing machine-to-machine communication. Such a unit is hereinafter called a mobile phone, although it should be realized that other implementations of the unit are possible as indicated above.

The device 100 for calculating an indication of power may be implemented within the mobile phone. An average received power may be needed to be determined e.g. for providing an indication of received signal strength to a radio signal transmitting unit.

The device 100 may comprise a receiver 102 for receiving a plurality of logarithmic values, wherein the logarithmic values represent in logarithmic domain a sequence of measurements of power of the received radio signal.

The measurements of power of the received radio signal may be performed by the mobile phone. The power of the signal in a specific frequency channel may be determined. The radio signal may thus be filtered to select the specific frequency channel, and the filtering may be realized in the digital baseband. This implies that the measurements of power are performed in digital domain.

Digital values representing a sequence of measurements of power may thus be obtained. These digital values may then be converted to a representation in logarithmic domain forming a plurality of logarithmic values. The conversion may be performed in a processing unit of the mobile phone. Then, the plurality of logarithmic values may be provided to the receiver 102, which may e.g. have an input for receiving the plurality of logarithmic values.

According to an alternative, the receiver 102 may comprise an input for receiving the digital values representing a sequence of measurements of power. Then, the receiver 102 may further comprise a converter for converting the digital values to logarithmic values. The logarithmic values may then be further transmitted from the receiver 102 for calculating an indication of power.

The device 100 may further comprise circuitry 104 for determining an average received power based on the plurality of logarithmic values. The circuitry 104 may comprise an adder 106 for pairwise summing of two logarithmic values and a plurality of memory registers 108 for storing intermediate sums of logarithmic values.

The method of determining an average received power will now be described in detail and then an implementation of the circuitry 104 will be further described.

Figure 2:
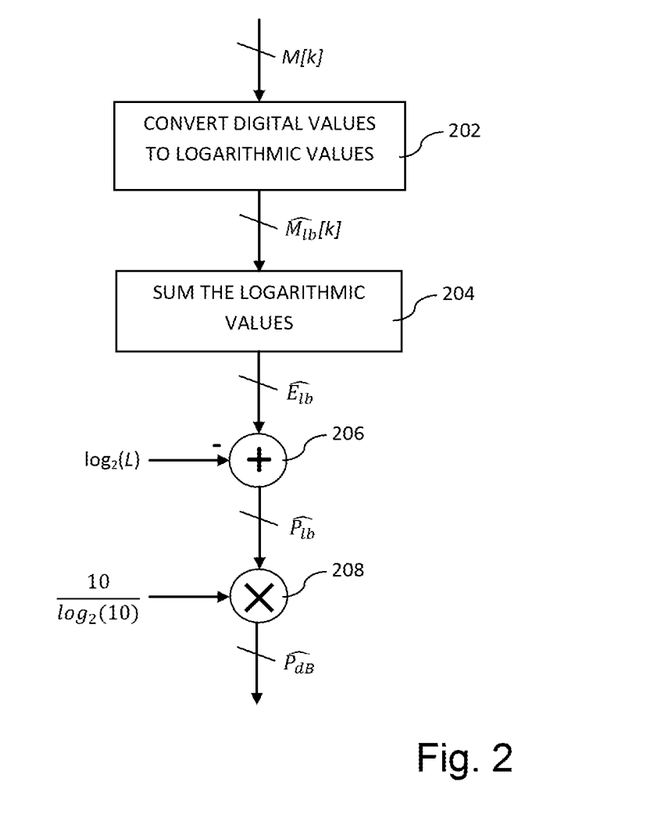
FIG. 2 is a flow chart illustrating a method according to an embodiment of the disclosure.

Referring now to FIG. 2, the digital values representing a sequence of measurements of power may be represented as a vector of samples M having a length L. The vector of samples M may e.g. contain a representation of the magnitude or envelope of the received signal. The digital values may thus be in an unsigned representation.

The digital values may first be converted to a binary logarithmic value, step 202.

According to an embodiment, the conversion is implemented as follows. A digital value M in the vector M is represented using a bit vector b of width B. The digital value thus equals $$M = \sum_{k=0}^{B-1} b[k]2^k,$$

where $b[k] \in \{0,1\}$.

Conversion of a squared value of M into a binary logarithmic value $M_{lb}$ may be represented by the equation:

$$M_{lb} = \log_2(M^2) = 2\log_2\left(\sum_{k=0}^{B-1} b[k]2^k\right).$$

The logarithmic operation combined with the squaring could be implemented using a look-up table. Alternatively, combinational logic may be used for determining the logarithmic value.

The size of the look-up table may be limited, such that it would not be necessary to use $2^B$ entries in the look-up table. Firstly, the largest-index K for which the bit value in the bit vector b equals 1 represents the most significant bit that is of relevance for the digital value M. Thus, all bits with larger index, equaling 0, may be ignored. Secondly, a mantissa m[l] may be determined, where the mantissa is a bit vector of width W, i.e. $l \in \{0, 1, \ldots, W-1\}$ such that $$m[l] = \begin{cases} b[K-W+l] & \text{if } l \geq W-K \\ 0 & \text{otherwise} \end{cases}.$$

The value of M can now be approximated by $$\hat{M} = 2^k \left( 1 + \sum_{l=0}^{W-1} m[l] 2^{l-W} \right).$$

The precision of the approximation of M may be controlled by changing the width W of the mantissa m[l].

The approximated value $\hat{M}$ may be converted into logarithmic domain, $$\hat{M}_{lb} = 2\log_2 \left( 2^k \left( 1 + \sum_{l=0}^{W-1} m[l] 2^{l-W} \right) \right)$$

$$\hat{M}_{lb} = 2K + 2\log_2 \left( 1 + 2^{-W} \sum_{l=0}^{W-1} m[l] 2^l \right)$$

$$\hat{M}_{lb} = 2K + f(m[k]),$$

where f is a mantissa value that may be determined by table look-up in a table with $2^W$ entries. The value of W may thus be a pre-determined number of bit values that are used in the approximation of M and affects the size of the look-up table and the accuracy of the determination of the logarithmic value.

The pre-determined number of bit values W may be set in the range of 3-6. For instance, by setting the pre-determined number of bit values W to 5, an error in the determination of average received power caused by the approximation compared to an error-free computation has in tests been shown to be below 0.25 dB.

If K is large, bits will be truncated when only W bit values are allowed to contribute in determination of the mantissa value. Thus, the estimation of $\widehat{M_{lb}}$ is constantly underestimating. The effect of this underestimation may be reduced by adding a small constant to the mantissa values in the entries of the look-up table.

Further, the size of a bit vector of each entry in the look-up table is relevant both to the accuracy of the average power determination and to the complexity of calculations.

A pre-determined number of fractional bits $B_f$ are used in representing a mantissa value returned by the look-up table. Thus, the size of a bit vector of each entry in the look-up table will be $B_f+1$, since the maximum value f(m[k]) can reach is <2 as 0≤m[k]<2.

The maximum value $\widehat{M_{lb}}$ can obtain is 2B, the number of bits needed to represent $\widehat{M_{lb}}$ equals $1+[\log_2(B)]+B_f$.

The pre-determined number of bits, $B_f+1$, used for representing the mantissa value affects the size of the look-up table and the accuracy of the determination of the logarithmic value.

The pre-determined number of bits $B_f+1$ may be set in the range of 5-7. For instance, by setting the pre-determined number of bits $B_f+1$ to 6, an error in the determination of average received power caused by the approximation compared to an error-free computation has in tests been shown to be below 0.25 dB.

However, the mantissa value follows approximately a linear curve. Thus, an alternative implementation using a look-up table would be to represent the mantissa value as $$f(m[k]) = 2^{-W} \sum_{l=0}^{W-1} m[l] 2^l + \tilde{f}(m[k]),$$

where $\tilde{f}(m[k])$ is determined by table look-up.

Although the conversion is described above as converting unsigned digital values to binary logarithmic values of squared digital values, it is contemplated that the conversion may instead receive as input signed digital values. Also or alternatively, the conversion may output a logarithmic value in another base or need not provide logarithmic values of squared digital values.

The plurality of logarithmic values may be provided to a summing operation, step 204.

According to an embodiment, the summing operation is implemented as follows. First, if A and B represent two digital values, the sum of the squared values may be defined as $C^2 = A^2 + B^2$. The corresponding logarithmic value, $C_{lb}$, of this sum may according to the above conversion from digital values to logarithmic domain be represented as $$C_{lb} = \log_2(A^2 + B^2) = \log_2(2^{\log_2(A^2)} + 2^{\log_2(B^2)}) = \log_2(2^{A_{lb}} = 2^{B_{lb}}).$$

The sum of a first and a second logarithmic value may then be defined by the operator $\oplus$ and the sum of two logarithmic values $A_{lb}$ and $B_{lb}$ may be represented as $$A_{lb} \oplus B_{lb} = \log_2(2^{A_{lb}} + 2^{B_{lb}}) =$$
$$= \log_2(2^{\max(A_{lb}, B_{lb})}(1 + 2^{-|A_{lb} - B_{lb}|})) =$$
$$= \max(A_{lb}, B_{lb}) + c(|A_{lb} - B_{lb}|),$$

where c(x)≤1, which is obtained if x=0. The operator $\oplus$ is commutative and associative, i.e. A$\oplus$B=B$\oplus$A and (A$\oplus$B)$\oplus$C=A $\oplus$(B$\oplus$C), respectively.

Thus, the sum of a first and second logarithmic value may be calculated by determining the largest value of the first and the second logarithmic values and adding a rest value to the determined largest value. The function c(x) may thus represent the rest value, wherein the input value x to the function is the difference between the first and the second logarithmic values.

The rest value may be determined by table look-up in a look-up table. The look-up table may be limited in size by using the fact that c(x) is approximately zero for all x>>0. Thus, the rest value may be immediately approximated to zero if the difference between the first and the second logarithmic values is larger than a set threshold. Table look-up may then only be performed when the difference is smaller than the set threshold.

The value T of the set threshold affects the size of the look-up table and the accuracy of the determination of the logarithmic value. If the fractional part of the logarithmic values may be represented by $B_f$ bits as defined above, the look-up table for determining the rest value may be realized by $TB_f$ entries and each entry may be represented by a bit vector of size $B_f$.

The value T of the set threshold may be set in the range of 4-16. For instance, by setting the value T of the threshold to 8, an error in the determination of average received power caused by the approximation compared to an error-free computation has in tests been shown to be below 0.25 dB.

However, by using the approximation of the rest value to zero, the operator $\oplus$ is no longer associative. This implies that the order of operations affect the result and/or accuracy. The plurality of logarithmic values is summed using a recursive procedure including a plurality of summations of first and second logarithmic values. A partial sum obtained during the recursive procedure will thus represent a sum of a number of power measurements. Such partial sums will then be added to each other in further summations in order to eventually obtain a sum of all the logarithmic values. The first and second logarithmic value in each individual summation of the recursive procedure will represent substantially the same number of power measurements. This implies that a plurality of such small errors is not allowed to accumulate to a large error in the total sum of the plurality of logarithmic values.

Figure 3:
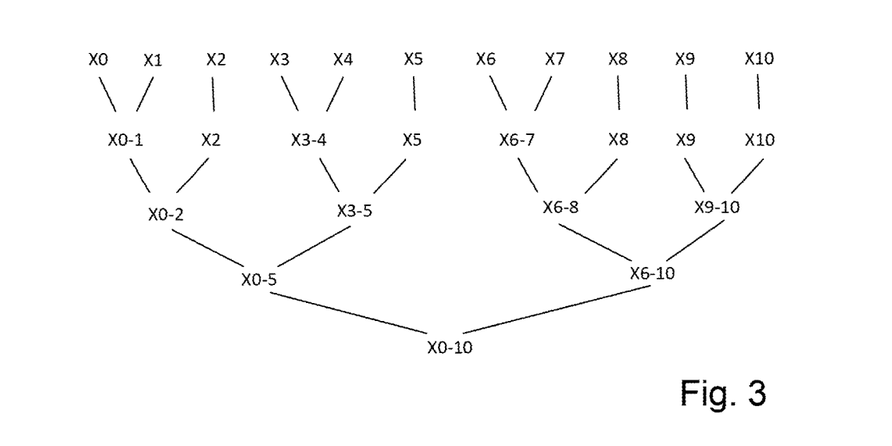
FIG. 3 is a schematic illustration of a recursive procedure for summing a plurality of logarithmic values according to an embodiment of the disclosure.

The recursive procedure may be described in a binary tree structure that represents the individual summations included in the recursive procedure. Such a binary tree is shown in FIG. 3, wherein summations performed for a vector of samples $M=\{x_0, x_1, \ldots, x_L\}$ having length $L=11$ is shown. Each node in the tree has two branches and represents the sum of the two branches. A sum of values is indicated by brackets and the range of values included in the sum. The number of power measurements represented by the two branches differs maximally by 1. This implies that the approximation to zero of the rest value when calculating a sum only occurs when the values are truly different and not because the number of power measurements represented by the two logarithmic values is imbalanced.

If the number of samples is not a power of 2, the binary tree structure is imperfect. However, the imperfection may only apply to the highest level of the binary tree containing leaves, while the rest is a full binary tree, as may be seen in FIG. 3. Thus, the plurality of logarithmic values may first be shortened to a number of values that is a power of 2.

The reducing of the number of logarithmic values may be achieved by either pairwise summing two subsequent logarithmic values or passing through the logarithmic value directly. The number of pairwise summations that are needed in order to obtain a number of values that is a power of 2 equals $L-2^{\lfloor \log_2 L \rfloor}$, which in the example of $L=11$ becomes 3, and these summations may be distributed over the sequence of logarithmic values such that the number of logarithmic values in the branches of the binary tree will be substantially the same.

Thereafter, summing of the plurality of remaining logarithmic values may be performed by a recursive procedure, which is a memory and hardware effective way of solving by a full binary tree.

However, the pairwise summations in order to bring the resulting number of values to a power of 2 need not necessarily be perfectly distributed over the sequence of logarithmic values. Thus, it would not be necessary to ensure that the pairwise summations are distributed over the sequence of logarithmic values. This may imply that the number of power measurements represented by the first and second logarithmic value in individual summations may sometimes differ by more than 1.

A probability of an error being introduced by summing a first and second logarithmic value that represent different number of power measurements may be quantified.

Let the first logarithmic value represent N number of individual power measurements and the second logarithmic value represent R number of individual power measurements, wherein R is larger than N. The number of measurements represented by the second logarithmic value may thus be expressed as $R=\alpha N$, where $\alpha>1$. The individual power measurements are assumed to be independent, identically distributed random variables. After squaring, the variables have a mean $\mu$ and variance $\sigma^2$.

An error when summing the first and second logarithmic values will be introduced if the difference between the values is above the set threshold T as the rest value will then be approximated to zero. As a rule of thumb, the probability of an error being introduced may be considered dependent on the expression $$\frac{\mu\sqrt{L}}{\sigma\sqrt{2}} \frac{(\alpha - 2^T)}{\sqrt{\alpha + 2^{2T}}}.$$

In one embodiment, the recursive procedure is arranged such that the probability of introducing an error is maintained so low that it is virtually negligible. For instance, if the error probability is to be held below $10^{-6}$, then $$\frac{\mu\sqrt{L}}{\sigma\sqrt{2}} \frac{(\alpha - 2^T)}{\sqrt{\alpha + 2^{2T}}} < -3.36.$$

Thus, even though the error probability is not used for designing the recursive procedure, the above expression may be used for checking whether there is a risk of introducing errors in the recursive procedure.

Hence, according to an embodiment, the first and the second logarithmic value in individual summations of the recursive procedure represents a first and a second number of power measurements, respectively, wherein the second number of power measurements is equal or larger than the first number of power measurements, and the recursive procedure is such that $$\frac{\mu\sqrt{L}}{\sigma\sqrt{2}} \frac{(\alpha - 2^T)}{\sqrt{\alpha + 2^{2T}}} < -3,$$

wherein $\mu$ is a mean value and $\sigma^2$ is a variance of squared values of the power measurements, L is the first number of power measurements, $\alpha$ is a factor relating the second number of power measurements to the first number of power measurements, and T is the set threshold.

According to an alternative, the individual summations included in the recursive procedure may be performed while a sequence of logarithmic values is successively received. Thus, although the summations as illustrated in FIG. 3 will be performed, the individual summations are performed as soon as the logarithmic values included in each individual summation has been received.

In one embodiment, the average received power may be represented as $$P_{dB} = 10\log_{10}\left(\frac{1}{L}\sum_{k=0}^{L-1} M[k]^2\right).$$

Referring again to FIG. 2, the summing of the plurality of logarithmic values results in a binary logarithmic representation $\widetilde{E_{lb}}$ of a sum of the measurements of power. The method further comprises subtracting $\log_2(L)$ from $\widetilde{E_{lb}}$, step 206, to form a binary logarithmic value of the average power. Then, the logarithmic value is multiplied by $$\frac{10}{\log_2 10} = 3.0103,$$

step 208, in order to convert the representation of average power to be expressed in dB.

Figure 4:
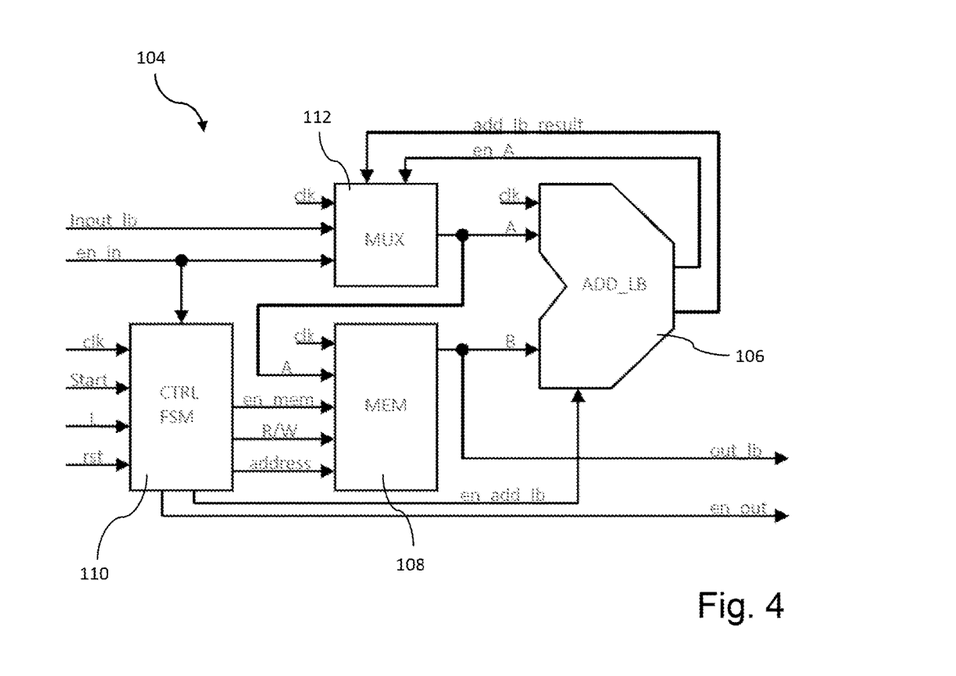
FIG. 4 is a schematic drawing of a circuitry for summing a plurality of logarithmic values according to an embodiment of the disclosure.

Referring now to FIG. 4, a circuitry 104 for implementing the above-described method of summing a plurality of logarithmic values will be described in detail.

The circuitry 104 may comprise a control unit 110, which may provide signals to other parts of the circuitry 104 in order to trigger actions. The control unit 110 may provide a clock signal, which controls timing of the parts of the circuitry 104. Alternatively, a clock signal may be provided from an external unit and received by the parts of the circuitry 104.

A multiplexer 112 may receive a sequence of logarithmic values. The multiplexer 112 forwards received values to an adder 106 and a memory 108 for storing values in a memory register. Upon receipt of a control signal, the memory 108 may output a stored value to the adder 106. The adder 106 may further receive a control signal in order to trigger the adding of values from the multiplexer 112 and the memory 108. The adder may implement the logarithmic summation as described above.

The adder 106 may be implemented as an application-specific integrated circuit, including a look-up table for determining the rest value. In one implementation, the adder 106 first subtracts the value received from the memory 108 from the value received from the multiplexer 112. The sign of the subtraction provides information of which of the values is the largest value. Then, the absolute value of the subtraction is used as input to a look-up table, which returns the rest value. The adder 106 then adds the rest value to the largest value and outputs this addition as the sum of the two incoming values.

The sum of the logarithmic values may be output from the adder 106 to the multiplexer 112 and may then be transmitted to the memory 108 for storing the intermediate sum.

The circuitry 104 may thus provide a recursive procedure for providing a sum of the plurality of logarithmic values. The sum may be output from the memory 108 to further circuitry or a processing unit for determining the average received power based on the sum of the plurality of logarithmic values.

Figure 5A:
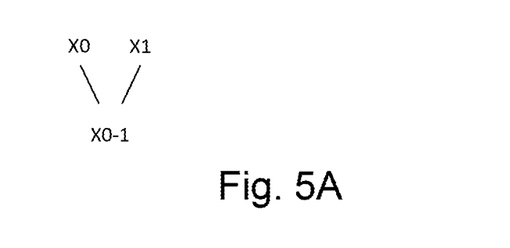
FIGS. 5A, 5B, and 5C are schematic illustrations of intermediate stages of a recursive procedure for summing a plurality of logarithmic values according to an embodiment of the disclosure.
Figures 5B, 5C:
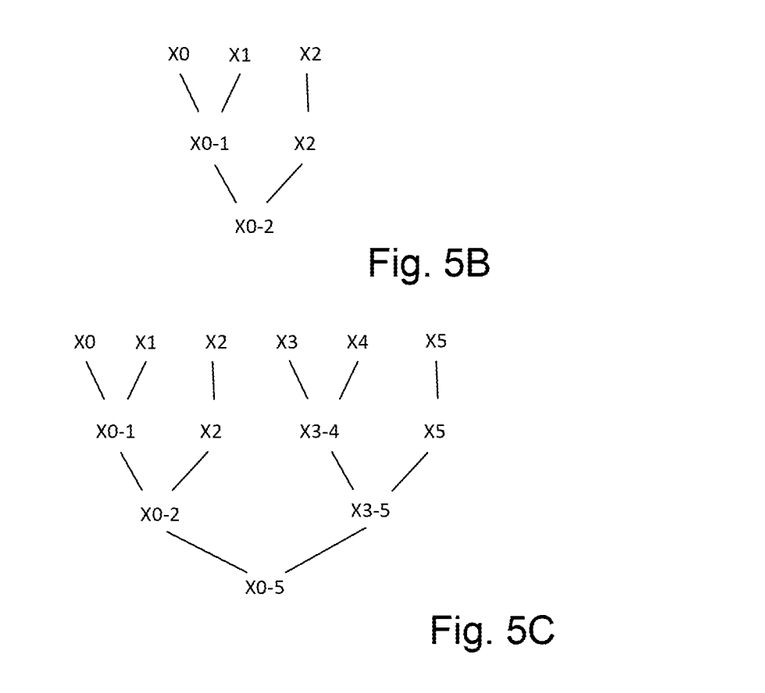

Referring also to FIGS. 5A, 5B, and 5C, the summing operations will be further described. The multiplexer 112 may first receive the first value $x_0$ in the sequence of logarithmic values. The value $x_0$ is passed to the memory 108 for intermediate storing in the memory register. The multiplexer may then receive the second value $x_1$. The second value $x_1$ is passed to the adder 106, which also receives the first value $x_0$ from the memory 108. These values are added by the adder 106, as illustrated in FIG. 5A. The sum $x_{0-1}$ is output by the adder 106 to the multiplexer 112, which passes the sum $x_{0-1}$ to the memory 108 for intermediate storing in the memory register.

The multiplexer 112 then receives the third value $x_2$. The third value $x_2$ is passed to the adder 106, which also receives the sum $x_{0-1}$ from the memory 108. These values are added by the adder 106, as illustrated in FIG. 5B. The sum $x_{0-2}$ is output by the adder 106 to the multiplexer 112, which passes the sum $x_{0-2}$ to the memory 108 for intermediate storing in the memory register.

The summing of values may thus be continued in similar manner for performing the summing operations of the recursive procedure. The multiplexer 112 may thus sequentially receive the fourth, fifth and sixth values $x_3$, $x_4$, and $x_5$. The fourth and fifth values may be added to each other and the sum may be stored as an intermediate sum, and then the sixth value may be added to the sum. Thereafter, the sum $x_{3-5}$ may be added by the adder 106 to the sum $x_{0-2}$ as illustrated in FIG. 5C. Again, summing operations and storing of the intermediate sums may be continued until all the logarithmic values have been summed as illustrated in FIG. 3.

In the above the disclosure has mainly been described with reference to a limited number of embodiments. However, as is readily appreciated by a person skilled in the art, other embodiments than the ones disclosed above are equally possible within the scope of the disclosure, as defined by the appended claims.

What is claimed is:

1. A method for calculating an indication of power of a received radio signal, the method comprising:
   receiving, in a receiver, a plurality of logarithmic values, wherein the logarithmic values represent in logarithmic domain a sequence of measurements of power of the received radio signal; and
   determining, in circuitry, an average received power based on the plurality of logarithmic values, wherein determining comprises:
      summing first and the second logarithmic values of the plurality of logarithmic values, wherein a sum of the first and the second logarithmic value is calculated by comparing the first and the second logarithmic values, determining the largest value of the first and the second logarithmic values based on the comparison, and adding a rest value to the determined largest value, wherein the rest value is based on a difference between the first and the second logarithmic values and is determined by a look-up in a table and is approximated to zero if the difference between the first and the second logarithmic values is larger than a set threshold,
   wherein summing of the plurality of logarithmic values is performed by a recursive procedure including a plurality of summations of the first and second logarithmic values such that the first and the second logarithmic value in individual summations of the recursive procedure represent substantially same number of power measurements.

2. The method according to claim 1, wherein receiving a plurality of logarithmic values comprises:
   receiving a plurality of digital values representing a sequence of measurements of power of the received radio signal; and
   converting the plurality of digital values to a representation in logarithmic domain forming the plurality of logarithmic values.

3. The method according to claim 2, wherein each of the plurality of digital values is represented by a bit vector and conversion of the digital value comprises:
   determining a largest index in the bit vector having a bit value of 1; and
   calculating a binary logarithm of the digital values based on a sum of the largest index and a mantissa value determined by table look-up, wherein a pre-determined number of bit values below the largest index are used as input to the table look-up.

4. The method according to claim 3, wherein the predetermined number of bit values is in a range of 3-6.

5. The method according to claim 3, wherein calculating the binary logarithm includes adding a small constant to the mantissa value.

6. The method according to claim 3, wherein the table look-up of the mantissa value returns a fractional number represented by a predetermined number of bits.

7. The method according to claim 6, wherein the predetermined number of bits is in a range of 5-7.

8. The method according to claim 1, wherein the number of power measurements represented by the first and the second logarithmic value in individual summations of the recursive procedure is equal or differs by no more than 1.

9. The method according to claim 1, wherein the recursive procedure comprises pairwise summations of logarithmic values to replace two logarithmic values by one summed logarithmic value such that the resulting number of logarithmic values is a power of 2.

10. The method according to claim 1, wherein the plurality of logarithmic values represents binary logarithms of squared digital values.

11. The method according to claim 1, wherein the set threshold controlling that the rest value is approximated to zero is in a range of 4-16.

12. A device for calculating an indication of power of a received radio signal, the device comprising:
 a receiver for receiving a plurality of logarithmic values, wherein the logarithmic values represent in logarithmic domain a sequence of measurements of power of the received radio signal;
 circuitry for determining a sum of the plurality of logarithmic values as basis for determination of an average received power; wherein the circuitry comprises:
   an adder for pairwise summing of first and second logarithmic values of the plurality of logarithmic values, wherein a sum of the first and the second logarithmic value is calculated by comparing the first and the second logarithmic values, determining the largest value of the first and the second logarithmic values based on the comparison, and adding a rest value to the determined largest value, wherein the rest value is based on a difference between the first and the second logarithmic values and is determined by a look-up in a table and is approximated to zero if the difference between the first and the second logarithmic values is larger than a set threshold, and
   a plurality of memory registers, which are arranged to store intermediate sums of logarithmic values, wherein the circuitry is arranged to control the logarithmic values being provided to the adder to sum the plurality of logarithmic values by a recursive procedure such that the first and the second logarithmic value in individual summations of the recursive procedure represent substantially same number of power measurements.

13. The device according to claim 12, wherein the receiver comprises:
 an input for receiving a plurality of digital values representing a sequence of measurements of power of the received radio signal; and
 a converter for converting the plurality of digital values to a representation in logarithmic domain forming the plurality of logarithmic values.

* * * * *